BREWER & STOW.
Whip-Socket.
No. 47,277.
Patented Apr. 18, 1865.
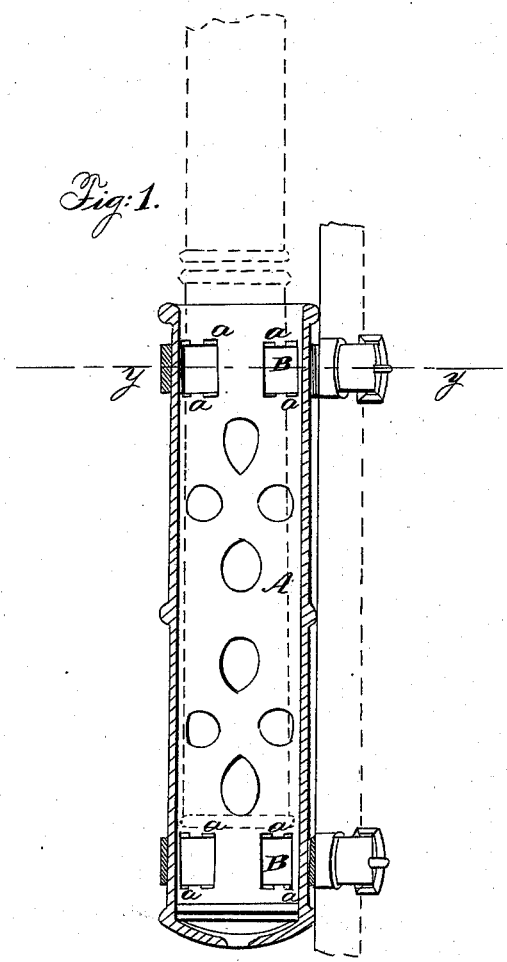
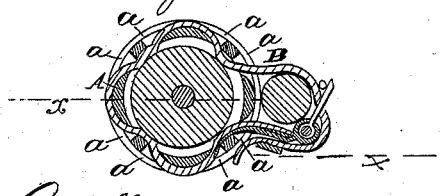
Witnesses.
Wm Dean Overell
Theo. Tusche
Inventor.
J. F. Brewer
E. E. Stow
per Munn & Co
Attorney

UNITED STATES PATENT OFFICE.

JAMES F. BREWER AND ENOS E. STOW, OF PLANTSVILLE, CONNECTICUT.

IMPROVEMENT IN WHIP-SOCKETS.

Specification forming part of Letters Patent No. 47,277, dated April 18, 1865.

*To all whom it may concern:*

Be it known that we, JAMES F. BREWER and ENOS E. STOW, of Plantsville, in the county of Hartford and State of Connecticut, have invented a new and useful Improvement in Attaching Whip-Sockets to Dash-Boards; and we do hereby declare that the following is a full, clear, and exact description thereof, which will enable those skilled in the art to make and use the same, reference being had to the accompanying drawings, forming part of this specification, in which—

Figure 1 is a vertical section of our invention, taken in the line $x\ x$, Fig. 2; Fig. 2, a horizontal section of the same, taken in the line $y\ y$, Fig. 1.

Similar letters of reference indicate corresponding parts.

This invention relates to an improved mode of attaching whip-sockets to the dash-boards of vehicles by means of straps; and it consists in having the socket provided at its upper and lower ends with slots or openings, through which the straps are passed and made to encompass the socket in such a manner as to form what may be termed "cushions" or "guards" within the socket to hold the whip-stock firmly and at the same time protect it from abrasion or injury, the straps also serving as a means for securing the socket to the dash-board.

A represents a whip-socket, which may be of cast-iron, sheet metal, or of any of the materials now used for such purpose. The whip-socket may be of the usual form or shape, and it is provided, near its upper and lower ends, with slots or openings $a$, extending all around it at suitable distances apart. The most preferable plan would probably be to have the slots or openings in pairs—that is to say, two quite close together, with a considerably wider space between them and the adjoining pairs, as shown more particularly in Fig. 2.

B B represent straps, which may be of leather. This would perhaps be the most preferable material. These straps B are passed through the slots or openings $a$, which are of such dimensions as to receive them freely. The staps are passed through one slot or opening into the socket and out through the one next adjoining, and then into the socket through the next slot or opening, and so on, as clearly shown in Fig. 2. By this means the straps are made to encompass the whip socket securely, the straps being fastened by buckles to the dash-board. Besides serving as a means to secure the socket to the dash-board, the straps, in consequence of being passed in and out through the slots or openings $a$ in the socket, as described, serve as a cushion or guard for the whip-stock, (shown in red,) preventing it from working in the socket, and preserving it from wear or abrasion.

This invention, although applicable to any kind of whip-socket, is more especially adapted for those of cast-iron, as the straps may be applied to those sockets with the greatest facility.

We claim as new and desire to secure by Letters Patent—

The securing of whip-sockets to the dash-boards of vehicles by means of straps passing alternately in and out through slots or openings in the socket, substantially as herein shown and described.

JAMES F. BREWER.
ENOS E. STOW.

Witnesses:
STEPHEN WALKLEY, Jr.,
O. W. STOW.